(12) United States Patent
Hishida et al.

(10) Patent No.: US 7,960,883 B2
(45) Date of Patent: Jun. 14, 2011

(54) MOTOR ASSEMBLY WITH COAXIAL SHAFTS

(75) Inventors: Hideo Hishida, Tokyo (JP); Shinya Igarashi, Tokyo (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 0 days.

(21) Appl. No.: 12/683,192

(22) Filed: Jan. 6, 2010

(65) Prior Publication Data

US 2010/0187929 A1 Jul. 29, 2010

(30) Foreign Application Priority Data

Jan. 28, 2009 (JP) .................. 2009-016395

(51) Int. Cl.
*H02K 16/00* (2006.01)
*H02K 7/06* (2006.01)
*H02K 5/00* (2006.01)
*H02K 47/00* (2006.01)

(52) U.S. Cl. ............. 310/112; 310/22; 310/24; 310/89; 310/113; 310/114

(58) Field of Classification Search .......... 310/112–114, 310/22, 24, 89; 318/400.41
See application file for complete search history.

(56) References Cited

U.S. PATENT DOCUMENTS
2,778,960 A * 1/1957 Anderson .................. 310/113

FOREIGN PATENT DOCUMENTS
JP 2587913 8/1995
JP 07213007 A * 8/1995

OTHER PUBLICATIONS
Machine Translation JP07213007 (1995).*

* cited by examiner

*Primary Examiner* — Quyen Leung
*Assistant Examiner* — Jose A Gonzalez Quinones
(74) *Attorney, Agent, or Firm* — Fay Sharpe LLP (57) ABSTRACT

A motor assembly with coaxial shafts is provided which can be produced at low costs and in which a plurality of motors can be disposed with their respective rotary shafts arranged coaxially to one another with high coupling and assembling accuracy in a simple structure. Each motor includes a housing member and ball bearings to rotatably support the rotary shaft and two adjacent motors are fixedly coupled together such that the respective housing members of the adjacent motors are fitted with each other.

2 Claims, 9 Drawing Sheets

MOTOR ASSEMBLY WITH COAXIAL SHAFTS

BACKGROUND OF THE INVENTION

1. Field of the Invention

The present invention relates to a motor assembly with coaxial shafts and more particularly to a motor assembly with coaxial shafts in which a plurality of rotary shafts are adapted to rotate on a common axis.

2. Description of the Related Art

Such type of motor assembly with coaxial shafts (hereinafter referred to simply as "motor assembly" as appropriate) is conventionally known in Patent Reference 1 (Japanese Patent No. 2587913). The motor assembly disclosed in Patent Reference 1 has a hollow rotation shaft and a solid rotation shaft inserted into the hollow rotation shaft and each of the rotation shafts is supported by plain bearings.

In the conventional motor assembly disclosed in Patent Reference 1, a motor adapted to rotate the hollow rotation shaft and another motor adapted to rotate the solid rotation shaft are individually provided and these two motors are coupled to each other in such a manner that a recess formed on a plain bearing of one of the two motors is fitted with a boss formed on a plain bearing of the other motor.

Plain bearings are used in the motor assembly disclosed in Patent Reference 1. However, in general, working accuracy for an inner circumferential surface and an outer circumferential surface of the plain bearings is at best several tens of micrometers and, therefore, in case of a stepping motor having an air gap of about 60 micrometers between a stator and a rotor, there is a possibility of contact between the stator and the rotor due to the deviation of the center.

Further, the motor assembly disclosed in Patent Reference 1, in which the boss and the recess formed on the respective plain bearings are fitted with each other to thereby couple together these two motors, has another problem in that oil exudes onto the surface of the plain bearings, that is, oil-impregnated sintered bearings, causing friction force between the boss and the recess to be lowered and thus decreasing coupling strength between the two motors. Even if an adhesive material is used for ensuring the coupling, adhesion force is lowered by the oil.

Another proposed solution is to use ball bearings instead of plain bearings. However, when a recess and a boss which are formed on outer or inner rings of the ball bearings, are fitted with each other to couple the motors, the ball bearings are subjected to excessive external force, which shortens the life of the bearings. In addition, the excessive external force imposed causes torque variation in the motors. Moreover, high working and assembling accuracy is required for forming the recess and the boss on the outer or inner rings of the ball bearings, which makes the production difficult and thus indicating a highly probable increase in costs.

SUMMARY OF THE INVENTION

The present invention has been made in view of the above, and it is an object of the present invention to provide a motor assembly with coaxial shafts in which a plurality of motors can be coaxially coupled to one another in a simple structure with a high coupling and assembling accuracy and which can be produced at low costs.

In order to achieve the object described above, according to a first aspect of the present invention, there is provided a motor assembly with coaxial shafts, which includes a plurality of motors each including: a rotary shaft; ball bearings to rotatably support the rotary shaft; and a housing member to constitute the outline of the motor, wherein the plurality of motors are disposed with their respective rotary shafts arranged coaxially to one another where two adjacent motors are fixedly coupled together such that the housing member of one motor is fitted with the housing member of the other motor.

According to a second aspect of the present invention, there is provided a motor assembly with coaxial shafts, which includes: a first motor including a rotary shaft, ball bearings to rotatably support the rotary shaft, and a first housing member including a front portion and a rear portion and configured to constitute the outline of the first motor; and a second motor including a rotary shaft, ball bearings to rotatably support the rotary shaft, and a second housing member including a front portion and a rear portion and configured to constitute the outline of the second motor, wherein the first motor and the second motor are disposed with their respective rotary shafts arranged coaxially to each other and are fixedly coupled together such that the first housing member is fitted with the second housing member.

In the second aspect of the present invention, one of the first and second motors may have a hollow shaft, the other thereof may have a solid shaft and the solid shaft may pass through the hollow shaft.

In the second aspect of the present invention, a boss may be provided on a portion of the first housing member of the first motor and a recess may be provided on a portion of the second housing member of the second motor opposing the portion of the first housing member of the first motor, wherein the first motor and the second motor are securely coupled together such that the boss is fitted with the recess.

With the above configuration, a motor assembly with coaxial shafts is provided inexpensively in which a plurality of motors can be coupled to one another with a simple configuration and with high coupling and assembling accuracy.

Specifically, in the above configuration, dimensional accuracy of the bearing is improved by using ball bearings having a higher dimensional accuracy than plain bearings, and at the same time the sliding surface areas are thereby eliminated. As a result, oil applied to the sliding surface areas is not required, thus preventing reduction of coupling strength between the motors. The motors are coupled to each other by housing members provided discrete from respective bearings and made of aluminum or iron machined at high dimension accuracy, whereby a motor assembly with coaxial shafts, in which the motors are coupled to one another at high assembling accuracy without forming a boss and a recess in the bearings, can be provided at low costs.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The present invention will now be described in further detail with respect to various embodiments with reference to the accompanying drawings.

Figure 1:
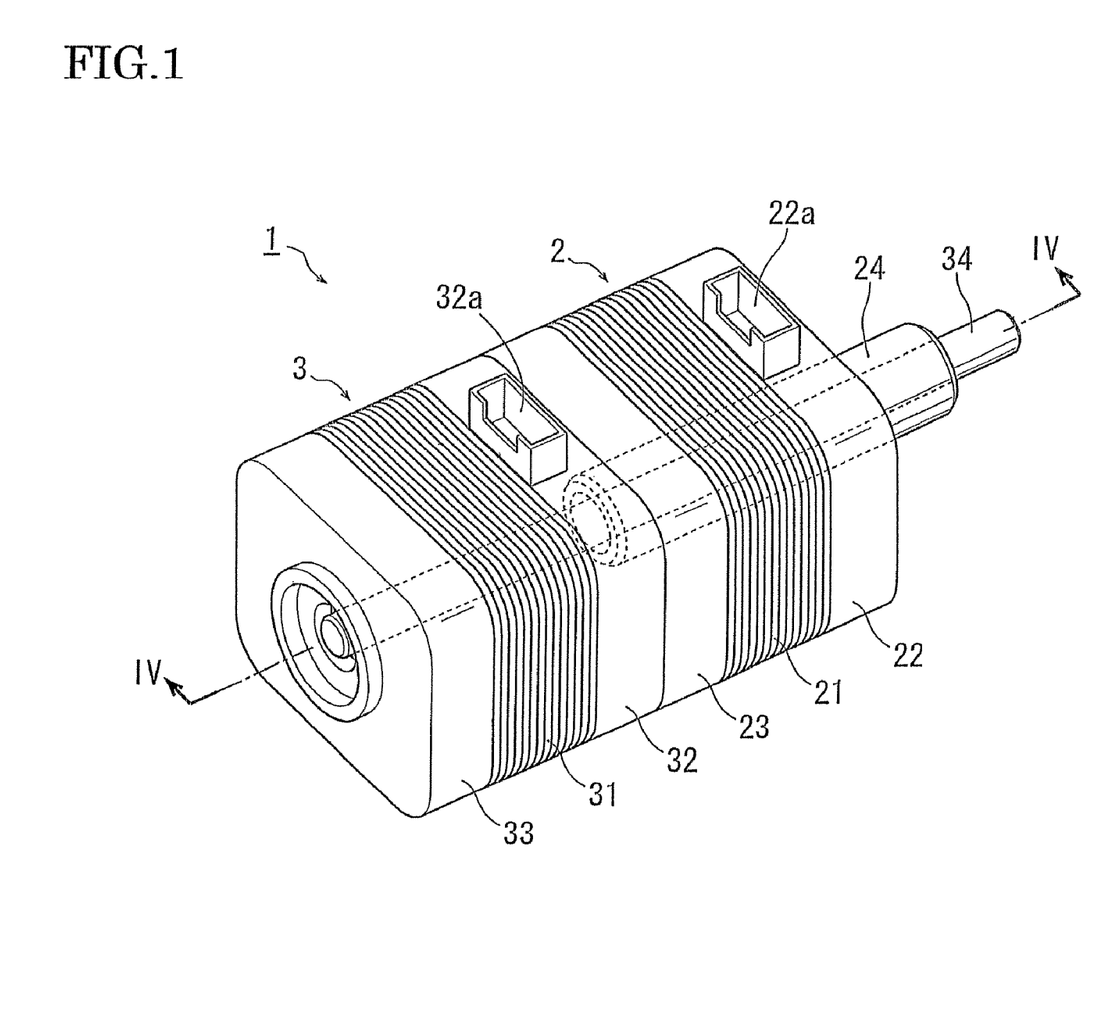
FIG. 1 is a perspective view of a motor assembly according to a first embodiment of the present invention.

FIG. 1 is a perspective view of a motor assembly 1 according to a first embodiment of the present invention.

The motor assembly 1 of the first embodiment includes a first motor 2 and a second motor 3, which are coaxially coupled to each other. The first motor 2 has a rotary shaft 24 and the second motor 3 has a rotary shaft 34.

Figure 2:
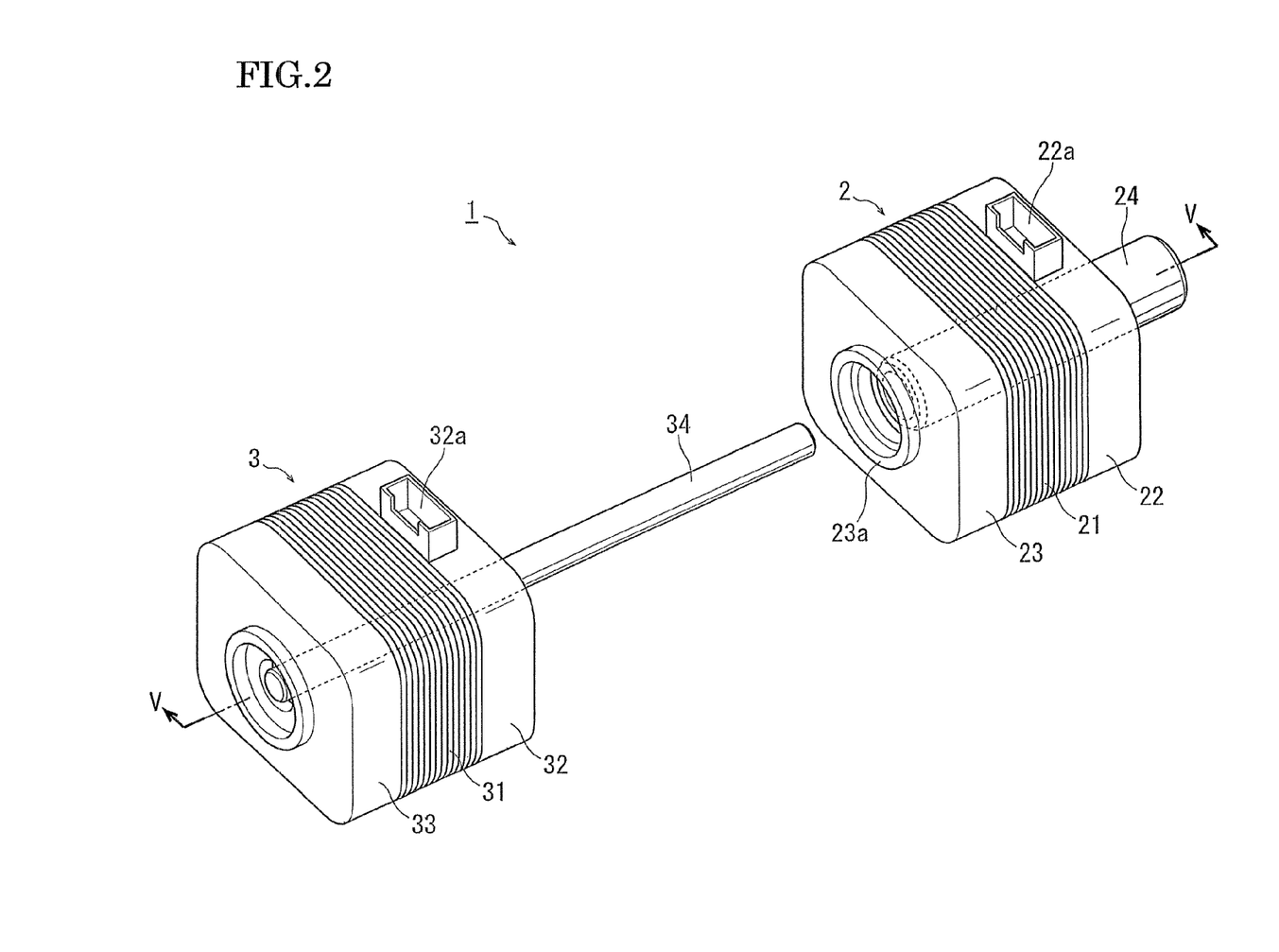
FIG. 2 is a perspective view of the motor assembly of FIG. 1, showing two individual motors in a disassembled state.
Figure 3:
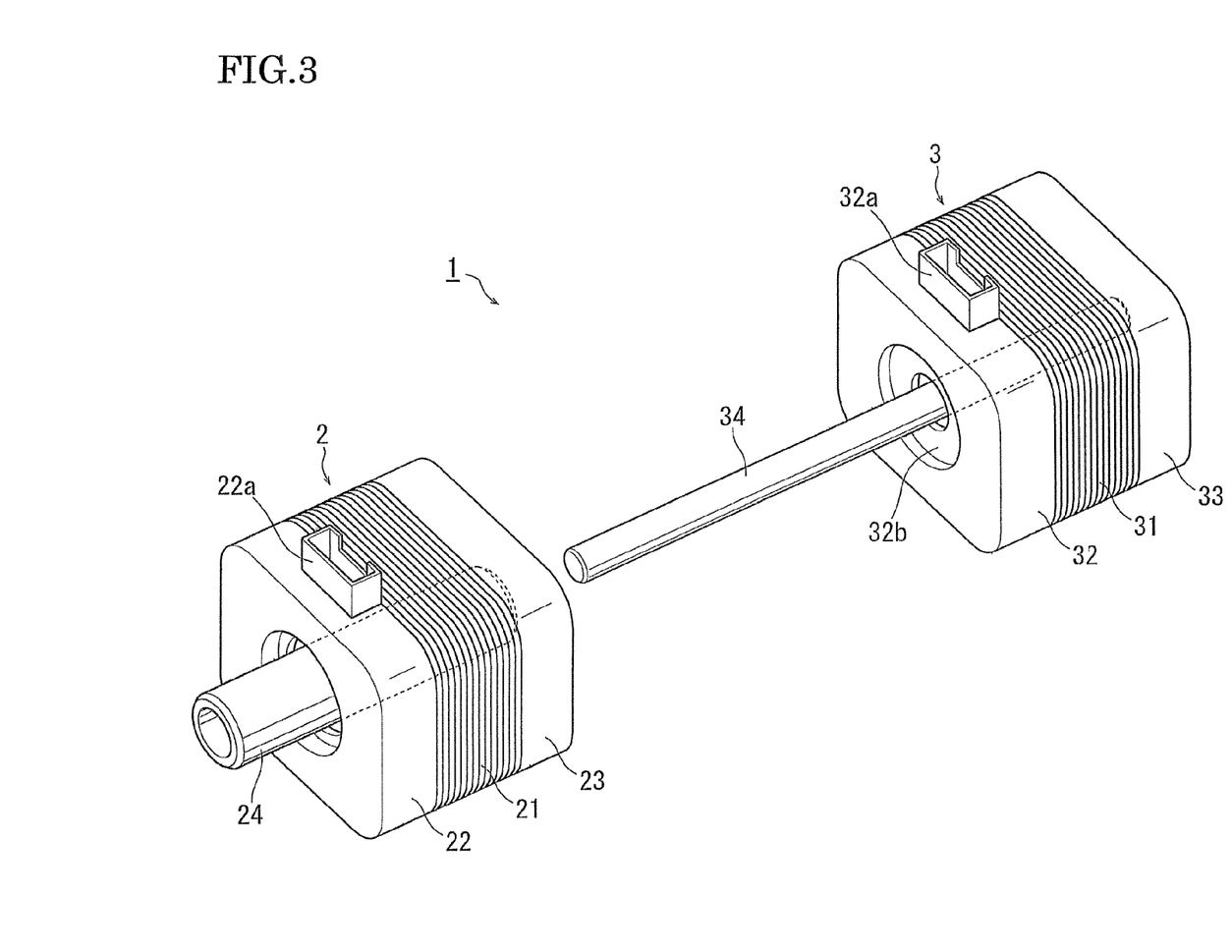
FIG. 3 is a perspective view of the motor assembly in the disassembled state of FIG. 2 but seen from a different angle.

FIG. 2 is a perspective view of the motor assembly 1 shown in FIG. 1 which is disassembled into the first and second motors 2 and 3. FIG. 3 shows the motor assembly 1 in the same disassembled state as FIG. 2 but viewed from a different angle so that the first motor 2 is located closer to the viewer.

Referring to FIGS. 2 and 3, the first motor 2 includes a stator stack 21 constructed of laminated electromagnetic steel plates, a front flange 23 as a front housing located axially forward of the stator stack 21 and a rear flange 22 as a rear housing located axially rearward of the stator stack 21. The rear flange 22 is provided with a connector 22a having a terminal for supplying electric power to the first motor 2 and the front flange 23 is provided with an annular boss 23a.

The second motor 3 includes a stator stack 31 constructed of laminated electromagnetic steel plates, a front flange 33 as a front housing located axially forward of the stator stack 31 and a rear flange 32 as a rear housing located axially rearward of the stator stack 31. The rear flange 32 is provided with a connector 32a having a terminal for supplying electric power to the second motor 3 and with a circular recess 32b which is to be fitted with the annular boss 23a provided on the front flange 23 of the first motor 2.

The rotary shaft 24 of the first motor 2 is hollow and when the first motor 2 and the second motor 3 are coupled together, the rotary shaft 34 of the second motor 3 is adapted to pass through the hollow of the rotary shaft 24 of the first motor 2 and the boss 23a of the first motor 2 fits into the recess 32b of the second motor 3. Thus, the first and second motors 2 and 3 are fixedly coupled to each other and the motor assembly 1 is completed.

Figure 4:
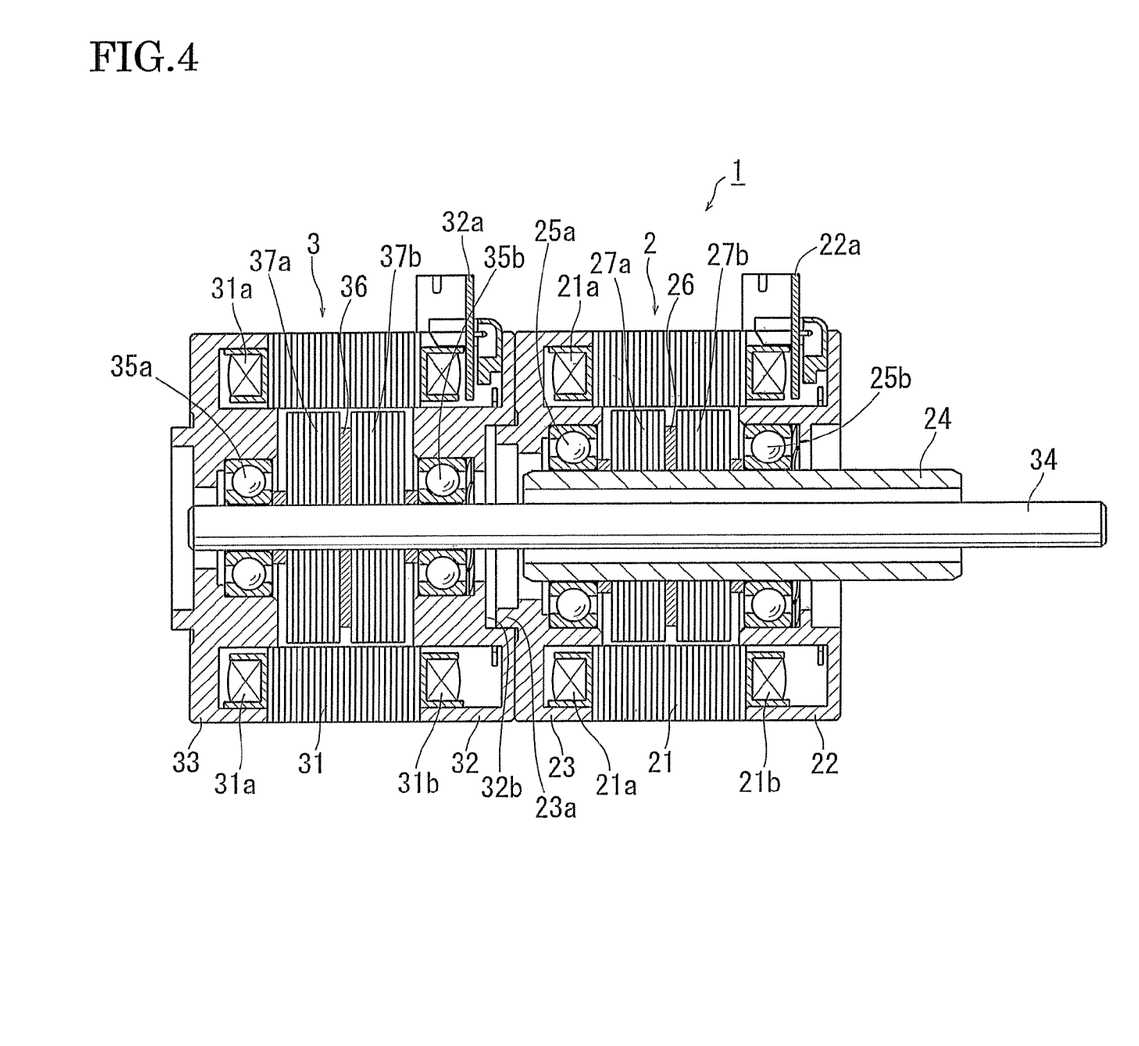
FIG. 4 is a cross-sectional view of the motor assembly of FIG. 1 taken along line IV-IV.
Figure 5:
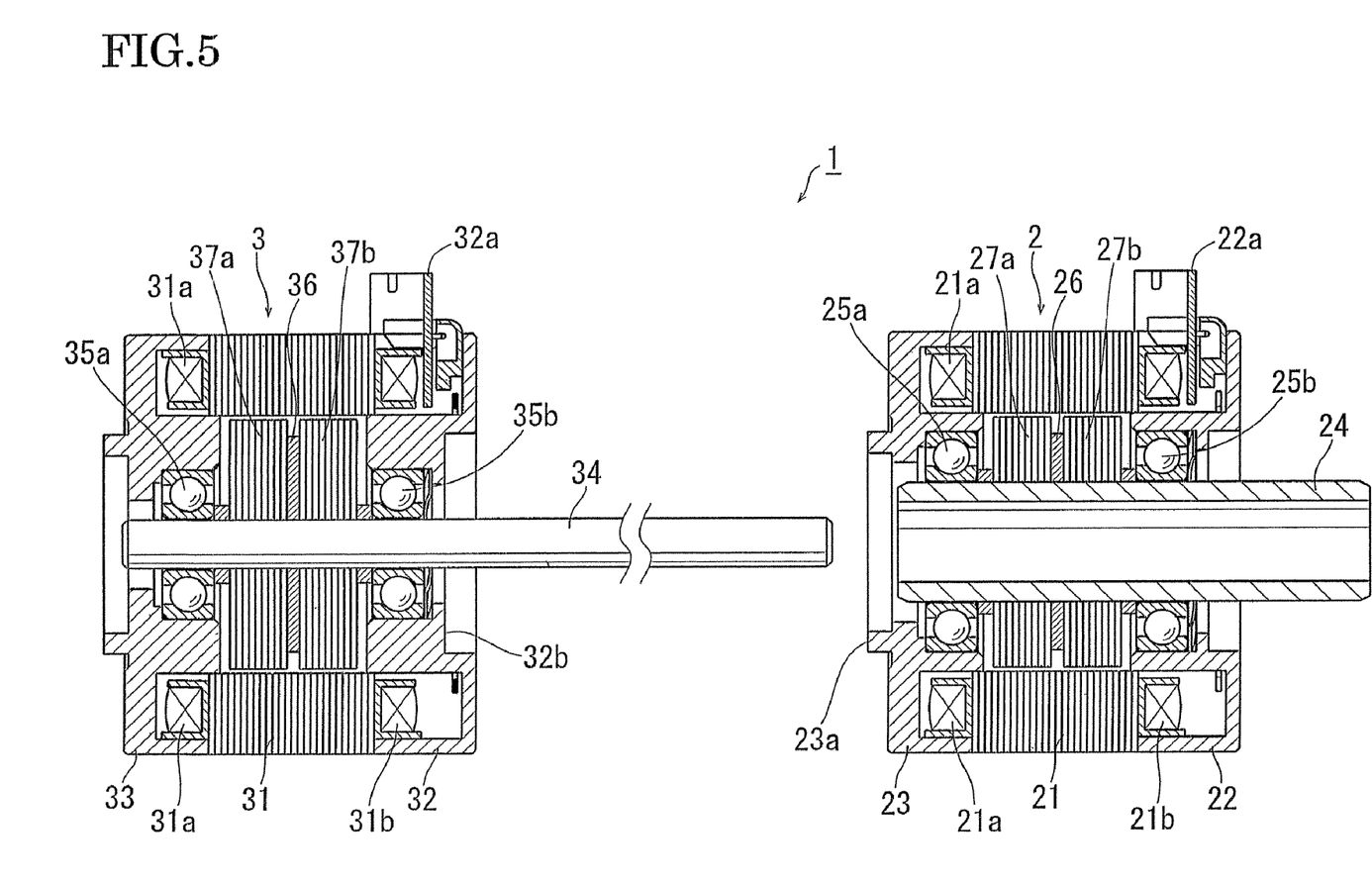
FIG. 5 is a cross-sectional view of the motor assembly in the disassembled state of FIG. 2 taken along line V-V.

FIG. 4 is a cross-sectional view of the motor assembly 1 of FIG. 1 taken along line IV-IV and FIG. 5 is a cross-sectional view of the motor assembly of FIG. 2 taken along line V-V.

Referring to FIGS. 4 and 5, a rotor of the first motor 2 includes a permanent magnet 26, and rotor stacks 27a and 27b which are made of electromagnetic steel plates and arranged to sandwich the permanent magnet 26 wherein the rotor is fixed onto the rotary shaft 24 of the first motor 2. Coils 21a and 21b are wound respectively at both sides of the stator stack 21 and the stator is excited by supplying electric power to these coils 21a and 21b. The stator stack 21 is fixedly arranged between the front flange 23 and the rear flange 22. The rotary shaft 24 is rotatably supported by ball bearings 25a and 25b fixedly attached respectively to the front and rear flanges 23 and 22.

A rotor of the second motor 3 includes a permanent magnet 36, and rotor stacks 37a and 37b which are made of laminated electromagnetic steel plates and arranged to sandwich the permanent magnet 36 wherein the rotor is fixed onto the rotary shaft 34 of the second motor 3. Coils 31a and 31b are wound respectively at both sides of the stator stack 31 and the stator is excited by supplying electric power to these coils 31a and 31b. The stator stack 31 is fixedly arranged between the front flange 33 and the rear flange 32 and the rotary shaft 34 is rotatably supported by ball bearings 35a and 35b fixedly attached to the front and rear flanges 33 and 32, respectively.

Thus, in the motor assembly 1 according to the first embodiment of the present invention, ball bearings, which have a higher dimensional accuracy than plain bearings, are used whereby dimensional accuracy of the bearing is improved and at the same time sliding surface areas are eliminated, which accordingly eliminates the necessity of oil applied to the sliding surface areas, thus preventing reduction in coupling strength between the motors.

Moreover, according to the first embodiment, the first and second motors 2 and 3 are securely coupled to each other by means of the housing members, that is, the front flange 23 of the first motor 2 and the rear flange 32 of the second motor 3 which are discrete from the bearings 25a and 35b, respectively, and made of aluminum or iron with high dimensional accuracy, whereby the first and second motors 2 and 3 can be coupled to each other with high assembling accuracy without forming a boss and a recess on the bearings 25a and 35b, and the motor assembly 1 with high assembling accuracy can be provided at low costs.

A second embodiment of the present invention will be described below with reference to FIG. 6 which is a perspective view of a motor assembly 100. FIG. 7 is a cross-sectional view of the motor assembly 100 of FIG. 6 taken along line VII-VII.

In the motor assembly 1 shown in FIG. 1, the rotary shafts 24 and 34 extend out from the rear flange 22 thus constituting output shafts of the motor assembly 1. On the other hand, in the motor assembly 100 of FIG. 6, rotary shafts of respective motors extend out in an opposite direction compared to the motor assembly 1 shown in FIG. 1.

The motor assembly 100 according to the second embodiment includes a first motor 102 and a second motor 103 coaxially coupled to each other. The first motor 102 has a rotary shaft 124 and the second motor 103 has a rotary shaft 134.

Figure 6:
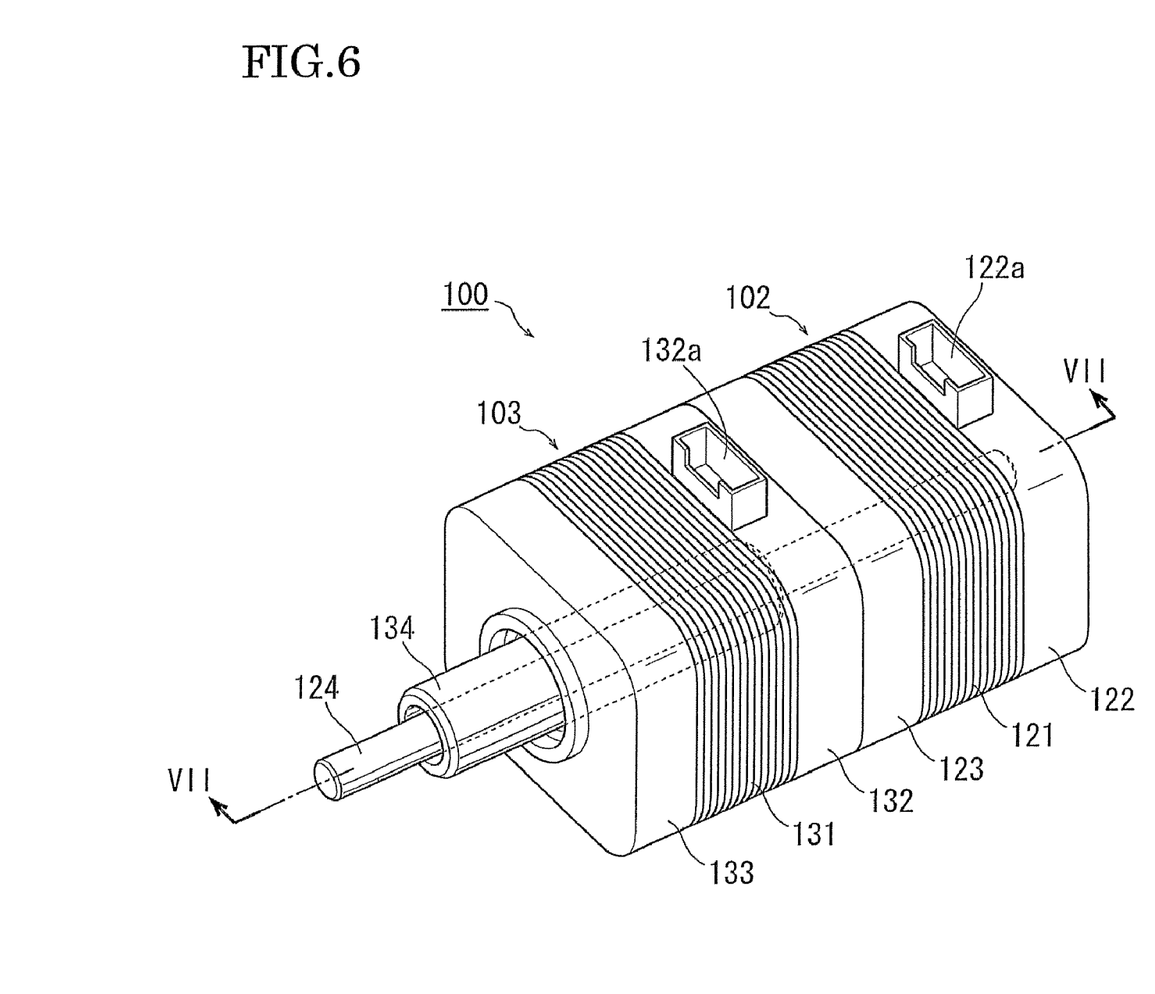
FIG. 6 is a perspective view of a motor assembly according to a second embodiment of the present invention.
Figure 7:
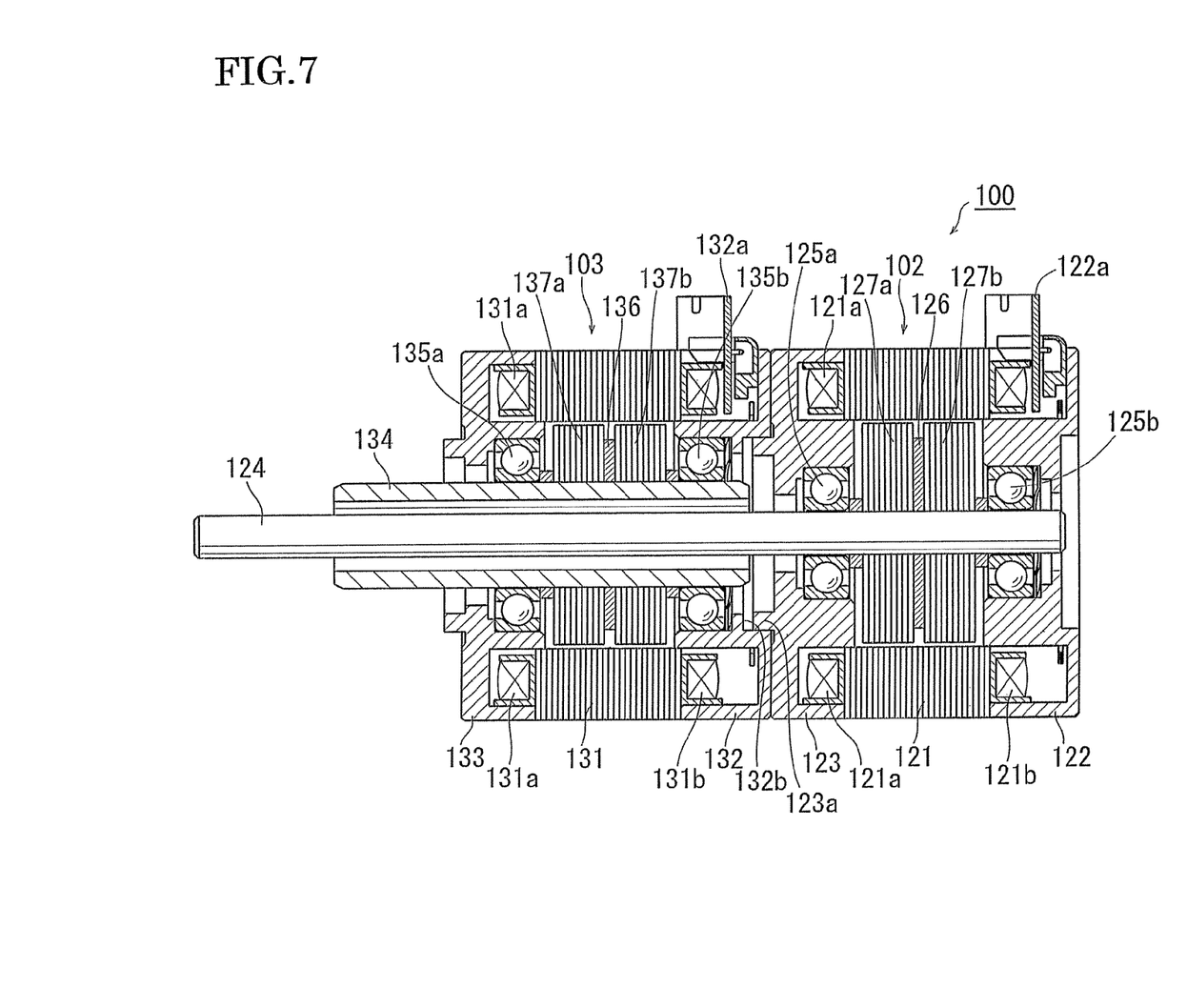
FIG. 7 is a cross-sectional view of the motor assembly of FIG. 6 taken along line VII-VII.

Referring to FIGS. 6 and 7, the first motor 102 includes a stator stack 121 constructed of laminated electromagnetic steel plates, a front flange 123 as a front housing located axially forward of the stator stack 121 and a rear flange 122 as a rear housing located axially rearward of the stator stack 121. The rear flange 122 is provided with a connector 122a having a terminal for supplying electric power to the first motor 102 and the front flange 123 is provided with an annular boss 123a.

The second motor 103 includes a stator stack 131 constructed of laminated electromagnetic steel plates, a front flange 133 as a front housing located axially forward of the stator stack 131 and a rear flange 132 as a rear housing located axially rearward of the stator stack 131. The rear flange 132 is provided with a connector 132a having a terminal for supplying electric power to the second motor 103 and with a circular recess 132b which is be fitted with the annular boss 123a of the first motor 102.

The rotary shaft 134 of the second motor 103 is hollow and when the first motor 102 and the second motor 103 are coupled together, the rotary shaft 124 of the first motor 102 is adapted to pass through the hollow of the rotary shaft 134 of the second motor 103 and the boss 123a of the first motor 102 fits into the recess 132b of the second motor 103. Thus, the first and second motors 102 and 103 are fixedly coupled to each other and the motor assembly 100 is completed.

Referring to FIGS. 6 and 7 again, a rotor of the first motor 102 includes a permanent magnet 126, and rotor stacks 127a and 127b which are made of electromagnetic steel plates and arranged to sandwich the permanent magnet 126 wherein the rotor is fixed onto the rotary shaft 124 of the first motor 102. Coils 121a and 121b are wound respectively at both sides of the stator stack 121 and the stator is excited by supplying electric power to these coils 121a and 121b. The stator stack 121 is fixedly arranged between the front flange 123 and the rear flange 122. The rotary shaft 124 is rotatably supported by ball bearings 125a and 125b fixedly attached to the front and rear flanges 123 and 122, respectively.

A rotor of the second motor 103 includes a permanent magnet 136, and rotor stacks 137a and 137b which are made of electromagnetic steel plates and fixedly arranged to sandwich the permanent magnet 136 wherein the rotor is fixed onto the rotary shaft 134 of the second motor 103. Coils 131a and 131b are wound respectively at both sides of the stator stack 131 and the stator is excited by supplying electric power to these coils 131a and 131b. The stator stack 131 is fixedly arranged between the front flange 133 and the rear flange 132 and the rotary shaft 134 is rotatably supported by ball bearings 135a and 135b fixedly attached to the front and rear flanges 133 and 132, respectively.

Thus, in the motor assembly 100 according to the second embodiment of the present invention, ball bearings, which have a higher dimensional accuracy than plain bearings, are used, whereby dimensional accuracy of the bearing is improved and also sliding surface areas are eliminated, which accordingly eliminates the necessity of oil applied to the sliding surface areas, thus preventing reduction in coupling strength between the motors.

Moreover, according to the second embodiment, the first and second motors 102 and 103 are securely coupled to each other by means of the housing members, that is, the front flange 123 of the first motor 102 and the rear flange 132 of the second motor 103 which are discrete from the bearings 135a and 135b, respectively, and made of aluminum or iron with high dimensional accuracy, whereby the first and second motors 102 and 103 can be coupled to each other with high assembling accuracy without forming a boss and a recess on the bearings 135a and 135b, and the motor assembly 100 with high assembling accuracy can be provided at low costs.

Figure 8:
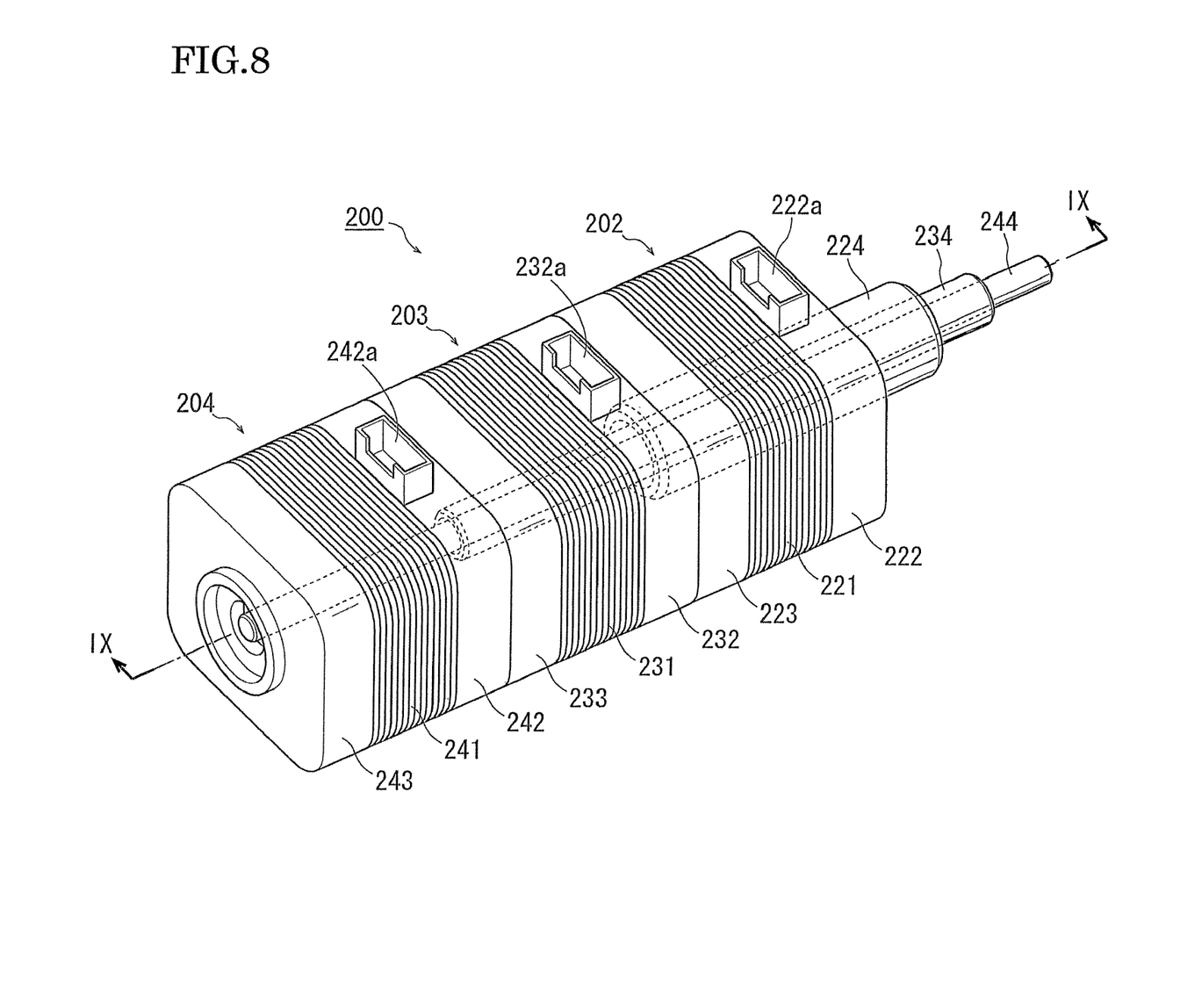
FIG. 8 is a perspective view of a motor assembly according to a third embodiment of the present invention.
Figure 9:
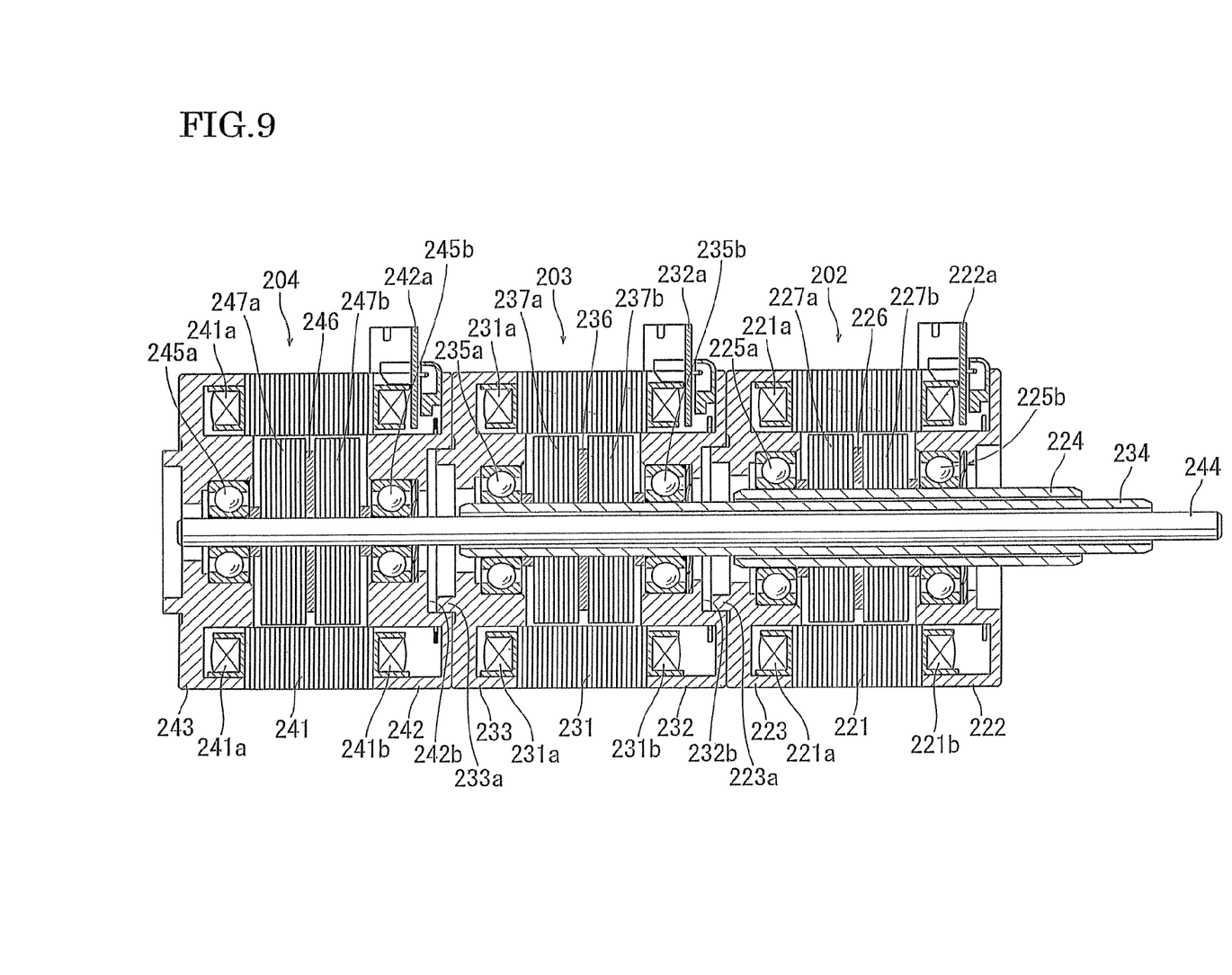
FIG. 9 is a cross-sectional view of the motor assembly of FIG. 8 taken along line IX-IX.

A third embodiment of the present invention is shown in FIG. 8 which is a perspective view of a motor assembly 200. FIG. 9 is a cross-sectional view of the motor assembly 200 of FIG. 8 taken along line IX-IX.

The motor assembly 200 includes three motors, specifically a first motor 202, a second motor 203 and a third motor 204 coaxially coupled to one another.

The first motor 202 has a rotary shaft 224, the second motor 203 has a rotary shaft 234 and the third motor 204 has a rotary shaft 244.

Referring to FIGS. 8 and 9, the first motor 202 includes a stator stack 221 constructed of laminated electromagnetic steel plates, a front flange 223 as a front housing located axially forward of the stator stack 221, a rear flange 222 as a rear housing located axially rearward of the stator stack 221 and ball bearings 225a and 225b. The rear flange 222 is provided with a connector 222a having a terminal for supplying electric power to the first motor 202 and the front flange 223 is provided with an annular boss 223a.

The second motor 203 includes a stator stack 231 constructed of laminated electromagnetic steel plates, a front flange 233 as a front housing located axially forward of the stator stack 231, a rear flange 232 as a rear housing located axially rearward of the stator stack 231 and ball bearings 235a and 235b. The rear flange 232 is provided with a connector 232a having a terminal for supplying electric power to the second motor 203 and with a circular recess 232b which is be fitted with the annular boss 223a of the first motor 202. The front flange 233 of the second motor 203 is provided with an annular boss 233a.

The third motor 204 includes a stator stack 241 constructed of laminated electromagnetic steel plates, a front flange 243 as a front housing located axially forward of the stator stack 241, a rear flange 242 as a rear housing located axially rearward of the stator stack 241 and ball bearings 245a and 245b. The rear flange 242 is provided with a connector 242a having a terminal for supplying electric power to the third motor 204 and with a circular recess 242b which is to be fitted with the annular boss 223a of the second motor 203.

The rotary shaft 224 of the first motor 202 is hollow and when the first motor 202 and the second motor 203 are coupled together, the rotary shaft 234 of the second motor 203 is adapted to pass through the hollow of the rotary shaft 224 of the first motor 202 and the boss 223a of the first motor 202 fits into the recess 232b of the second motor 203.

The rotary shaft 234 of the second motor 203 is also hollow and when the second motor 203 and the third motor 204 are coupled together, the rotary shaft 244 of the third motor 204 is adapted to pass through the hollow of the rotary shaft 234 of the second motor 203 and the boss 233a of the second motor 203 fits into the recess 242b of the third motor 204. Thus, the first, second and third motors 202, 203 and 204 are fixedly coupled to one another and the motor assembly 200 is completed.

Referring to FIGS. 8 and 9, a rotor of the first motor 202 includes a permanent magnet 226, and rotor stacks 227a and 227b which are made of electromagnetic steel plates and fixedly arranged to sandwich the permanent magnet 226 wherein the rotor is fixed onto the rotary shaft 224 of the first motor 202. Coils 221a and 221b are wound respectively at both sides of the stator stack 221 and the stator is excited by supplying electric power to these coils 221a and 221b. The stator stack 221 is fixedly arranged between the front flange 223 and the rear flange 222. The rotary shaft 224 is rotatably supported by ball bearings 225a and 225b fixedly attached to the front and rear flanges 223 and 222, respectively.

A rotor of the second motor 203 includes a permanent magnet 236, and rotor stacks 237a and 237b which are made of electromagnetic steel plates and fixedly arranged to sandwich the permanent magnet 236 wherein the rotor is fixed onto the rotary shaft 234 of the second motor 203. Coils 231a and 231b are wound respectively at both sides of the stator stack 231 and the stator is excited by supplying electric power to these coils 231a and 231b. The stator stack 231 is fixedly arranged between the front flange 233 and the rear flange 232 and the rotary shaft 234 is rotatably supported by ball bearings 235a and 235b fixedly attached to the front and rear flanges 233 and 232, respectively.

A rotor of the third motor 204 includes a permanent magnet 246, and rotor stacks 247a and 247b which are made of electromagnetic steel plates and fixedly arranged to sandwich the permanent magnet 246 wherein the rotor is fixed onto the rotary shaft 244 of the third motor 204. Coils 241a and 241b are wound respectively at both sides of the stator stack 241 and the stator is excited by supplying electric power to these coils 241a and 241b. The stator stack 241 is fixedly arranged between the front flange 243 and the rear flange 242 and the shaft 244 is rotatably supported by ball bearings 245a and 245b fixedly attached to the front and rear flanges 243 and 242, respectively.

Thus, in the motor assembly 200 according to the third embodiment of the present invention, ball bearings, which have a higher dimensional accuracy than plain bearings, are used whereby dimensional accuracy of the bearing is improved and at the same time sliding surface areas are eliminated, which accordingly eliminates the necessity of oil applied to the sliding surface areas, thus preventing reduction in coupling strength between the motors.

Moreover, according to the third embodiment, the first, second and third motors 202, 203 and 204 are securely coupled to one another by means of the housing members which are discrete from the bearings and made of aluminum or iron with high dimensional accuracy. Specifically, the first motor 202 and the second motor 203 are coupled to each other by the front flange 223 of the first motor 202 fitting with the rear flange 232 of the second motor 203, and the second motor 203 and the third motor 204 are coupled to each other by the front flange 233 of the second motor 203 fitting with the rear flange 242 of the third motor 204, whereby the first, second and third motors 202, 203 and 204 can be securely coupled to one another without forming a boss and a recess on the bearings 225a, 235b, 235a and 245b, and the motor assembly 200 with high assembling accuracy can be provided at low costs.

The present invention is applicable to a small-sized stepping motor in which a plurality of outputs can be obtained from coaxial shafts of motors.

It is apparent that the present invention is not limited to the above embodiments but may be changed and modified without departing from the scope and spirit of the invention. For example, in the embodiments described above, two adjacent motors in a motor assembly are coupled to each other such that an annular boss provided on the housing member of one motor is engaged with a circular recess provided on the housing member of the other motor, but the annular boss may alternatively be a pin, a tenon or the like while the circular recess may alternatively be a hole, a mortise, a groove or the like.

What is claimed is:

1. A motor assembly with coaxial shafts comprising a plurality of motors, each motor comprising:
    a rotary shaft;
    ball bearings to rotatably support the rotary shaft;
    a housing member comprising:
        a front portion and a rear portion and configured to constitute an outline of the motor;
        a boss on a first one of the front and rear portions; and
        a recess on a second one of the front and rear portions;
    wherein adjacent motors are securely coupled to each other such that the boss on the housing of a first motor is fitted with the recess on the housing of a second motor;
    wherein the first motor and the second motor are disposed with their respective rotary shafts arranged coaxially to each other.

2. The motor assembly according to claim 1, wherein one of the first and second motors comprises a hollow rotary shaft, the other thereof comprises a solid shaft, and the solid rotary shaft passes through the hollow rotary shaft.

* * * * *